United States Patent [19]

Muto et al.

[11] 3,956,211

[45] May 11, 1976

[54] ALKYD-TYPE RESIN COMPOSITION CONTAINING CHELATE COMPOUND HAVING CATALYTIC ACTIVITY

[75] Inventors: Shigeaki Muto; Shungi Masuda; Kanemasa Nomaguchi; Hisao Tanaka; Hiromi Kochi, all of Hitachi, Japan

[73] Assignee: Hitachi Chemical Company, Ltd., Japan

[22] Filed: July 20, 1973

[21] Appl. No.: 381,004

[30] Foreign Application Priority Data

July 24, 1972 Japan............................ 47-73421
Dec. 29, 1972 Japan............................ 48-3049

[52] U.S. Cl................... 260/22 CA; 260/22 CB; 260/429 C; 260/863; 427/340; 427/385
[51] Int. Cl................... C08f 21/04; C08g 17/16; C09d 3/68
[58] Field of Search............ 260/22 CA, 429 C, 863

[56] References Cited
UNITED STATES PATENTS

| | | | |
|---|---|---|---|
| 2,278,965 | 4/1942 | Van Peski et al............. | 260/429 C |
| 2,450,276 | 9/1948 | Fogler et al................. | 260/429 C |
| 2,933,475 | 4/1960 | Hoover et al................ | 260/22 CA |
| 3,578,619 | 5/1971 | Reeder....................... | 260/22 CA |
| 3,639,504 | 2/1972 | Paleologo et al............. | 260/863 |
| 3,644,612 | 2/1972 | Meyer et al................. | 260/22 CA |
| 3,652,718 | 3/1972 | Abrahami et al............. | 260/863 |
| 3,715,328 | 2/1973 | Stapfer et al............... | 260/22 CA |

OTHER PUBLICATIONS

Nishikawa et al., Bulletin Chemical Society, Japan, Vol. 37, 1964, pp. 1154–1160.

*Primary Examiner*—Ronald W. Griffin
*Attorney, Agent, or Firm*—Craig & Antonelli

[57] ABSTRACT

An alkyd-type resin composition comprising a chelate compound represented by the formula

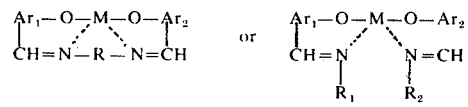

wherein M is a metal of the first transition metal group (except for nickel), lead, or zirconium; $Ar_1$ and $Ar_2$ are each an aromatic residue, a substituted aromatic residue, or a heterocyclic aromatic residue; R, $R_1$ and $R_2$ are each hydrogen, an alkyl residue, a cycloaliphatic alkyl residue, an aromatic residue, a substituted aromatic residue, or a jointed residue of these radicals, and the carbon chains of R, $R_1$ and $R_2$ may contain hetero atoms such as oxygen, nitrogen, or sulfur. The said resin composition is characterized by little change in properties with the lapse of time, accelerated curing, and improved drying characteristics without gel formation in the surface layer of the resin.

23 Claims, 1 Drawing Figure

ALKYD-TYPE RESIN COMPOSITION CONTAINING CHELATE COMPOUND HAVING CATALYTIC ACTIVITY

This invention relates to an alkyd-type resin composition containing a chelate compound having a catalytic activity. More particularly, the invention relates to an alkyd-type resin composition containing a chelate compound capable of manifesting not only a high cure-promoting effect which changes slightly with time, but also distinguished drying performance while superficial gel formation of the resin being suppressed.

The alkyd-type resins include unsaturated polyester resin, oil-modified alkyd resin, and the like, and are widely used for molding materials, surface coatings, etc. In order to cure these alkyd-type resins, particularly unsaturated polyester liquid compositions, there have been conventionally available two methods; one method comprises adding small amounts of an organic peroxide and curing the resin composition by heating, and the other comprises employing a combination of a curing agent and a promoter and curing the resin at room temperature. Particularly the latter method has been widely used because it is not only economically advantageous, but also suitable for wood products or the like which hate heating. Typical combinations of curing agents with promoters are ketone peroxides with cobalt soaps; benzoyl peroxide with dialkylanilines or toluidine derivatives; ketone peroxides with cobalt soaps and dialkylanilines or toluidine derivatives. Of these, combinations comprising cobalt soaps have been frequently used.

In order to simplify the steps of operation in curing an unsaturated polyester resin liquid composition at room temperature, a generally adopted mode of operation has consisted in admixing the curing agent just before commencement of the molding operation with the unsaturated polyester resin liquid composition which had previously been mixed with the promoter. However, a serious trouble with such a procedure has been such that when a cobalt soap had been previously admixed with an unsaturated polyester resin liquid composition, the cure-promoting activity of the cobalt soap decreased with time until it becomes necessary to replenish with the promoter just before starting the molding operation. Such a disadvantage will get even worse in the co-presence of a thixotropic agent or other promoters. For such a reason, it has become an important problem to develop a new promoter which undergoes little change with time in the unsaturated polyester resin liquid composition and which has a good solubility in organic solvents and the polyester resin.

On the other hand, particularly when the alkyd resin is used in surface coatings, metallic soaps containing cobalt, manganese, copper, lead, and calcium have conventionally been used widely as a drier for the paint film. In actual practice, there have been employed combinations of lead or calcium soaps, which are active drier for the resin in internal part of the film, and cobalt, manganese, or zirconium soaps, which are active driers for the superficial resin. However, the use of conventional metallic soaps as a drier for alkyd resin is accompanied with a serious disadvantage of gel formation in the superficial layer (skinning). It has been believed that this phenomenon is directly related with drying characteristics measurable by the paint film test and it is impossible to avoid skinning without adversely affecting the drying characteristics. A further disadvantage of the conventional metallic soaps is poor stability when incorporated into alkyd resin, particularly to water (including atmospheric moisture). These phenomena seem to originate chiefly from the structure of metallic soaps, because it is considered to be probable that the metallic soap, for example, cobalt naphthenate is easily decomposed by the terminal carboxyl group of the resin molecule, the unreacted carboxyl group contained in the resin, and a minute amount of water present in the resin to liberate Co (II) ions which concentrate in surface layer of the resin and activate atmospheric oxygen to facilitate redox catalytic reaction.

In order to improve the aforesaid disadvantages of the metallic soap, advent of a new drier which is stable against carboxylic acids in the resin and a minute amount of water has been hoped for. As a redox catalyst in the autoxidation of hydrocarbons, there have been conventionally used mainly a metal carboxylate represented by cobalt acetate or manganese acetate and a metal complex represented by cobalt acetylacetonate. These metal salts, however, were found to be unsuitable as a drier for the alkyd resin because they are not only unstable against acids or water, but also difficultly soluble in ordinary organic solvents and the alkyd resin.

As a result of extensive investigations to overcome the aforesaid various disadvantages of conventional cure-promoters and driers for use in alkyd resins, the present inventors have now found that the problems may be solved all at once by use of a chelate compound having a catalytic activity and represented by the formula, wherein M is a metal of the first transition metal group (except for nickel), lead, or zirconium; $Ar_1$ and $Ar_2$ are independently an aromatic residue, a substituted aromatic residue, or a heterocyclic aromatic residue; R, $R_1$ and $R_2$ are independently hydrogen, an alkyl residue, a cycloaliphatic alkyl residue, an aromatic residue, a substituted aromatic residue, or a jointed residue of these radicals, and the carbon chain of R, $R_1$ and $R_2$ may contain hetero atoms such as O, N and S. Based on this finding, the present invention has been achieved.

An object of this invention is to provide an alkyd-type resin composition which contains a chelate compound represented by the aforesaid formula (I) or (II) and which undergoes little change with time, yet promoted in curability. Another object of this invention is to provide an alkyd-type resin composition containing a chelate compound represented by the aforesaid formula (I) or (II) and which is excellent in drying characteristics without causing gel formation in the superficial resin layer. A further object of this invention is to provide a novel cure-promoter for use in alkyd-type resins and a drier for use in surface coatings. Other objects of this invention may become apparent from the following description.

The chelate compound of the aforesaid formula (I) or (II) used in this invention induces oxidation-reduction reaction in the resin system. It seems that, for example, in an unsaturated polyester resin, polymerization of the double bond is accelerated by radical decomposition action, and, for example, in an oil-modified alkyd resin, polymerization of the double bond is accelerated and at the same time oxidation of the resin is also accelerated. Such action of the chelate compounds is considered as a sort of catalytic action.

The chelate compounds represented by the aforesaid formula (I) or (II) are shown in, for example, in Bulletin of the Chemical Society of Japan, 37, 1154 (1964) and may be prepared in the following manner.

To a solution of 800 g (3.2 moles) of salicylaldehyde in 800 ml of methanol, is added 710 g (3.6 moles) of cyclohexylamine in small portions at a time to synthesize salicylaldehydecyclohexylimine. A considerable heat evolution is observed during the reaction. In a 10-liter four-necked flask, are placed 800 g (3.2 moles) of cobaltous acetate, 3.5 liters of methanol, and 2.0 liters of water, and stirred at 60°C. for 30 minutes. After the complete dissolution of cobaltous acetate has been confirmed, to the solution is added a methanol solution, of the above synthesized salicylaldehydecyclohexylimine slowly through a dropping funnel, whereupon immediately red crystals precipitate. After the dropwise addition is completed, 400 ml of $4N-Na_2CO_3$ is added and stirring is continued for 15 minutes. After filtration the reaction product is washed three times with water and dried in vacuo (5 mmHg, 70°C.). The yield is 1.320 g (percentage yield, 89 percent).

As stated above, the synthetic method for a metal chelate compound of a Schiff base has been known for comparative long and such metal chelate compounds have been developed as a starting material for heat-resistant polymers or semi-conductive organic substances. It is reported that thermal stability of these chelate compounds is closely related to the basicity of the amine that constitutes one of the components of a Schiff base and the higher the basicity of an amine, the more increased is the thermal stability of the chelate compound [C. Calvin and R. H. Bailes, J. Am. Chem. Soc., 68, 953 (1946); C. S. Marvel and N. Tarkoy, ibid., 80, 832 (1958)]. There is also a report on the solubility of these chelate compounds of a Schiff base in organic solvents and in polyester resin [H. Nishikawa and S. Yamada, Bull. Chem. Soc. Japan, 37, 1154 (1964)]. On further examination, it was found that the solubility raises no problem in actual use.

However, in any of the literature on the prior art concerning chelate compounds of a Schiff base, there is found neither report nor suggestions about such effects of a chelate compound on an alkyd resin as disclosed herein.

In the compound represented by the aforesaid formula (I) or (II), M represents a metal of the first transition metal group except for nickel, that is, Sc, Ti, V, Cr, Mn, Fe, Co, Cu and Zn; or lead or zirconium. Of these metals, particularly preferred are Co, Cu, Mn, Pb and Fe. $Ar_1$ and $Ar_2$ represent an aromatic residue derived from benzene, naphthalene, etc., an aromatic residue substituted with alkyl, halogen, nitro, hydroxy, etc., or a heterocyclic aromatic residue such as pyridine, quinoline, ferrocene, etc. R, $R_1$ and $R_2$ represent hydrogen, an alkyl residue of 1 to 20 carbon atoms, for example, methyl, ethyl, propyl, isopropyl, t-butyl, octyl, dodecyl, an cycloaliphatic alkyl residue having 3 to 8 carbon atoms, for example, cyclopropyl, cyclohexyl, cycloheptyl; an aromatic or substituted aromatic residue, for example, phenyl, benzyl, naphthyl, tolyl, anisyl nitrophenyl, chlorophenyl, etc.

Examples of preferable compounds include bis(N-phenylsalicylideneiminato)cobalt, N,N'-bis-(salicylidene)butylenediiminato cobalt, bis(N-cyclohexylsalicylideneiminato)cobalt, N,N'-bis-(salicylidene)-1,8-naphthalenediiminato cobalt, bis(N-tert-butylsalicylideneiminato)copper, bis(N-tert-butylsalicylideneiminato)manganese, bis(salicylidene)-N,N'-dipropylenediiminato cobalt, bis(salicylidene)-N,N'-ethylenediiminato cobalt, etc.

The alkyd-type resins include conventional alkyd resins and modified alkyd resins which are widely in ordinary use as a surface coating resin, for example, phthalic acid resins, glyphthal resins, resins of the aliphatic saturated polybase acid type, unsaturated alkyd resins, resins of the rosinmaleic anhydride type, terephthalic acid-type resins, etc.; and conventional unsaturated polyester resins which are widely in general use as a molding resin.

When the chelate compound represented by the formula (I) or (II) is added to an unsaturated resin for molding, the object of providing cure promotion which undergoes little change with time may be achieved, and when it is added to an alkyd or modified alkyd resin for surface coating, the object of providing improvement in drying characteristics without superficial gel formation may be achieved.

Explanation is given below concerning the case where the chelate compound represented by the aforesaid formula (I) or (II) is used for cure promotion of an unsaturated polyester resin.

1. Unsaturated polyester resin

The term "unsaturated polyester resin liquid composition" as used herein means a liquid composition prepared by mixing, in accordance with the prescribed formulation, (a) at least one $\alpha,\beta$-unsaturated dibasic acid such as maleic acid, (b) at least one polyhydric alcohol such as propylene glycol, and, if necessary, (c) at least one polybasic acid such as phthalic acid, subjecting the resulting mixture to thermal condensation under prescribed conditions to obtain an alkyd resin having an acid value of 60 or less, and then dissolving the alkyd resin in (d) a polymerizable monomer such as styrene.

Suitable $\alpha,\beta$-unsaturated dibasic acid for the said component (a) are fumaric acid, itaconic acid, and citraconic acid in addition to maleic acid; and anhydrides and halogen-substituted derivatives of these acids may also be used. The polyhydric alcohols to be used as the component (b) include ethylene glycol, diethylene glycol, triethylene glycol, dipropylene glycol, butylene glycol, hydrogenated type bisphenol A, trimethylolpropane, trimethylolpropane monoallyl ether, glycerine, diglycerine, and pentaerithrit in addition to propylene glycol. Monohydric alcohols such as benzyl alcohol and trimethylolpropane diallyl ether may also be used as a partial substitute. The polybasic acids for use as the component (c) include isophthalic acid, terephthalic acid, succinic acid, adipic acid, sebacic acid, tetrahydrophthalic acid, 3-methyl-4-cyclohexene-1,2-dicarboxylic acid, 3,6-endomethylene-Δ4-tetrahydrophthalic acid, trimellitic acid, and pyromellitic acid in addition to phthalic acid. Anhydrides, halogen-substituted derivatives, and esters of these acids may also be used. Beside polybasic acids, monobasic acids such as benzoic acid may be used as a partial substitute. The polymerizable monomers for use as the component (d) include methacrylic acid and esters thereof, vinyl acetate, vinyltoluene, divinylbenzene, vinylnaphthalene, vinyl ether, diallyl phthalate, diallyl maleate, diallyl fumarate, and other monomers containing polymerizable unsaturated groups, in addition to styrene. These monomers are used each alone or in combinations. The formulation of (a), (b) and (c) is that usually used in synthesizing alkyd resin. The ratio of the alcohol component (b) to the acid components (a) and (c) is desirably in the range of 1.00/1.00 to 1.20/1.00 in terms of (number of moles of hydroxyl group)/(number of moles of carboxyl group). The ratio of the component (a) to the component (b) in the acid components (a) and (c) may be selected as freely as in conventional alkyd resins, and may be controlled depending upon reactivity, workability and various other requirements.

2. Curing agent and polymerization inhibitor

For the curing agent, organic peroxides including ketone peroxides such as methyl ethyl ketone peroxide and cyclohexanone peroxide and hydroperoxides such as cumene hydroperoxide are used in an amount of 0.5 to 3.0 parts per 100 parts of the unsaturated polyester resin liquid composition. Polymerization inhibitors are used for the purpose of preventing gelation of the unsaturated polyester resin liquid composition during storage and of controlling the rate of curing. Currently known inhibitors such as hydroquinone, p-tert-butylcatechol, 2,5-di-tert-butylhydroquinone, p-quinone and copper ion may be used in an amount within the range of 0.001 to 0.5 part per 100 parts of the unsaturated polyester resin liquid composition.

3. Cure-promoter

The cure-promoter is a chelate compound of a Schiff base, represented by the general formula wherein $Ar_1$, $Ar_2$, R, $R_1$ and $R_2$ are the same as defined above. Conventional metallic soaps, nitrogen compounds, and β-diketones may also be used in combination with the said chelate compound. The amount of the chelate compound is to be added preferably within the range of 0.0005 to 0.1 part in terms of metal per 100 parts of the unsaturated polyester resin liquid composition.

In Examples given below, all parts and percentages are by weight.

The cold curing characteristics were measured in the following manner by the testing method as specified in items 4 and 7 of JIS K 6901 (1968).

Figure 1:
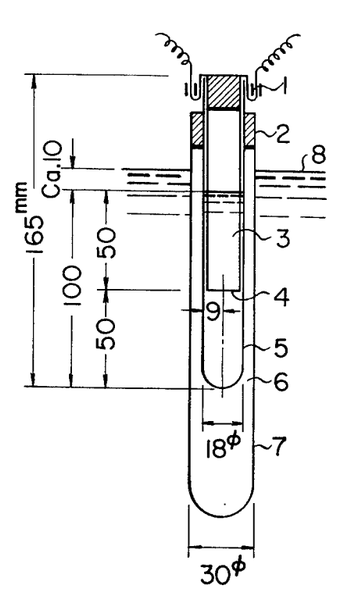
The accompanying drawing shows the apparatus for testing the cold curing characteristics.

Fifty grams of the liquid resin composition (prepared in the manner as described in Examples) was weighed into a 50 ml-beaker and the beaker was set in a thermostat at 25 ± 0.5°C. When the temperature of the resin composition reached at 25 ± 0.5°C., 0.5 g of a 55 percent-solution of methyl ethyl ketone peroxide was added thereto. After having been stirred thoroughly, the resin composition was transferred into a test-tube, which had been placed in the thermostat at 25 ± 0.5°C. as shown in the accompanying drawing, so that the depth of the resin composition may become 10 mm. The time elapsed from the addition of methyl ethyl ketone peroxide until the temperature of the resin composition reached 30°C. was taken as the gel time (minute) and the time elapsed until said temperature reached the maximum was taken as the minimum cure time, said maximum temperature being the peak exothermic temperature (°C).

The meaning of each numeral on the right side is as follows: 1 adhesive tape, 2 stopper, 3 liquid resin composition, 4 junction of a thermoelement for temperature meansurement, 5 test tube, 6 air, 7 test tube for thermal insulation, 8 fluid of a thermostat.

EXAMPLE 1

A mixture of 1.0 mole of maleic acid, 1.0 mole of phthalic anhydride, and 2.2 moles of propylene glycol was allowed to condense by heating at 200°C. under a stream of nitrogen. Sixty seven parts of the resulting unsaturated polyester having an acid value of 32 (hereinafter referred to as unsaturated polyester) was dissolved in 33 parts of styrene monomer containing 0.01 part of dissolved hydroquinone, and further admixed with 0.5 part of cobalt octonate (metallic cobalt content 6.0% by weight), which was dissolved therein, to obtain unsaturated polyester resin liquid composition I (hereinafter referred to as liquid resin composition I).

Sixty seven parts of the unsaturated polyester was dissolved in 30 parts of styrene monomer containing 0.01 part of hydroquinone dissolved therein, and further admixed with 3.0 parts of a styrene solution (metallic cobalt content 1.0 percent by weight) of bis(N-phenylsalicylideneiminato)cobalt, (metallic cobalt content 1.0% by weight), which was dissolved therein, to obtain an unsaturated polyester liquid resin composition II (hereinafter referred to as liquid resin composition II).

These liquid resin compositions I and II were kept in a thermostant at 40 ± 2°C. and daily change of the cold curing characteristics was measured. The curing agent employed was 1.0 parts of methyl ethyl ketone peroxide (active oxygen content 10.2%; "Permek," produced by Nippon Oils and Fats Co.) per 100 parts of the liquid resin composition. The results obtained were as shown in Table 1.

Table 1

| Liquid resin composition | 40°C.-day Property | 0 (The day on which prepared) | 7 | 14 | 21 | 28 | 60 |
|---|---|---|---|---|---|---|---|
| Liquid resin composition I | Gel time (min.) | 11.5 | 25.3 | 32.0 | 36.4 | 43.6 | 53.8 |
| | Minimum cure time (min.) | 20.3 | 41.1 | 54.9 | 59.6 | 64.3 | 81.5 |
| | Peak exothermic temperature (°C.) | 161 | 154 | 145 | 144 | 129 | 134 |
| Liquid resin composition II | Gel time (min.) | 12.3 | 15.6 | 17.4 | 16.9 | 17.8 | 18.0 |
| | Minimum cure time (min.) | 19.7 | 23.8 | 25.2 | 25.0 | 26.8 | 27.3 |
| | Peak exothermic temperature (°C.) | 174 | 169 | 172 | 168 | 165 | 167 |

Cold curing characteristics of liquid resin compositions I and II

EXAMPLE 2

Sixty-seven parts of the unsaturated polyester described in Example 1 was dissolved in 21 parts of styrene monomer containing 0.01 part of dissolved hydroquinone, and further admixed with 12 parts of a styrene solution (metallic cobalt content 0.25 percent by weight) of N,N'-bis(salicylidene)butylenediiminato cobalt to obtain an unsaturated polyester liquid resin composition III (hereinafter referred to as liquid resin composition III).

The liquid resin composition III was kept in a thermostat at 40 ± 2°C. and daily change of the cold curing characteristics was measured. The curing agent employed was 1.0 part of methyl ethyl ketone peroxide (the same as used in Example 1) per 100 parts of the liquid resin composition. The results obtained were as shown in Table 2.

Table 2

| 40°C-day Property | 0 (The day on which prepared) | 7 | 14 | 21 | 28 | 60 |
|---|---|---|---|---|---|---|
| Gel time (min.) | 15.7 | 18.4 | 19.2 | 18.9 | 19.5 | 20.9 |
| Minimum cure time (min.) | 27.0 | 35.5 | 36.7 | 36.1 | 37.3 | 36.9 |
| Peak exothermic temperature (°C.) | 155 | 150 | 149 | 154 | 149 | 146 |

Cold curing characteristics of liquid resin composition III.

EXAMPLE 3

Sixty-seven parts of the unsaturated polyester described in Example 1 was dissolved in 30 parts of styrene monomer containing 0.01 part of hydroquinone dissolved therein, and further admixed with 3.0 parts of a styrene solution (metallic cobalt content 1.0 percent by weight) of bis(N-cyclohexylsalicylideneiminato) cobalt to obtain unsaturated polyester liquid resin composition IV (hereinafter referred to as liquid resin composition IV).

The liquid resin composition IV was kept in a thermostat at 40 ± 2°C. and daily change of the cold curing characteristics was measured. The curing agent employed was 1.0 part of methyl ethyl ketone peroxide (the same as used in Example 1) per 100 parts of the liquid resin composition. The results obtained were as shown in Table 3.

Table 3

| 40°C-day Property | 0 (The day on which prepared) | 7 | 14 | 21 | 28 | 60 |
|---|---|---|---|---|---|---|
| Gel time (min.) | 13.2 | 16.1 | 17.3 | 17.9 | 18.3 | 18.9 |
| Minimum cure time (min.) | 24.5 | 28.7 | 29.6 | 30.8 | 29.9 | 31.4 |
| Peak exothermic temp. (°C.) | 165 | 162 | 159 | 159 | 155 | 157 |

Cold curing characteristics of liquid resin composition

EXAMPLE 4

Sixty-seven parts of the unsaturated polyester described in Example 1 was dissolved in 21 parts of styrene monomer containing 0.01 part of dissolved hydroquinone, and further admixed with 12 parts of a styrene solution (metallic cobalt content 0.25 percent by weight) of N,N'-bis(salicylidene)-1,8-naphthalenediiminato cobalt, to obtain unsaturated polyester liquid resin composition V (hereinafter referred to as liquid resin composition V).

The liquid resin composition V was kept in a thermostat at 40 ± 2°C. and daily change of the cold curing characteristics was measured. The curing agent employed was 1.0 part of methyl ethyl ketone peroxide (the same as in Example 1) per 100 parts of the liquid resin composition. The results obtained were as shown in Table 4.

Table 4

| 40°C Property | Cold curing characteristics of the liquid resin composition V | | | | | |
|---|---|---|---|---|---|---|
| | 0 (The day on which prepared) | 7 | 14 | 21 | 28 | 60 |
| Gel time (min.) | 26.0 | 29.8 | 32.1 | 33.4 | 34.2 | 37.5 |
| Minimum cure time (min.) | 39.6 | 45.3 | 45.8 | 49.6 | 48.1 | 54.7 |
| Peak exothermic temperature (°C.) | 158 | 157 | 160 | 154 | 156 | 153 |

EXAMPLE 5

Sixty-seven parts of the unsaturated polyester described in Example 1 was dissolved in 30 parts of styrene monomer containing 0.0025 part of hydroquinone dissolved therein, and further admixed with 3.0 parts of a styrene solution (metallic copper content 1.0 percent by weight) of bis(N-tert-butylsalicylideneiminato) copper, to obtain an unsaturated polyester liquid resin composition VI (hereinafter referred to as liquid resin compsotion VI).

The liquid resin composition VI was kept in a thermostat at 40 ± 2°C. and daily change of the cold curing characteristics was measured. The curing agent employed was 1.0 part of methyl ethyl ketone peroxide (the same as in Example 1) per 100 parts of the liquid resin composition. The results obtained were as shown in Table 5.

Table 5

| 40°C.-days Property | Cold curing characteristics of liquid resin composition VI | | | | | |
|---|---|---|---|---|---|---|
| | 0 (The day on which prepared) | 7 | 14 | 21 | 28 | 60 |
| Gel time (min.) | 52.8 | 60.4 | 63.7 | 67.4 | 62.6 | 64.7 |
| Minimum cure time (min.) | 91.7 | 100.3 | 112.5 | 108.6 | 104.6 | 112.9 |
| Peak exothermic temperature (°C.) | 118 | 109 | 98 | 107 | 115 | 101 |

EXAMPLE 6

Sixty-seven parts of the unsaturated polyester described in Example 1 was dissolved in 30 parts of styrene monomer containing 0.0025 part of dissolved hydroquinone, and further admixed with 12 parts of a styrene solution (metallic manganese content 0.25 percent by weight) of bis(N-tert-butylsalicylideneiminato) manganese, to obtain an unsaturated polyester liquid resin composition VII (hereinafter referred to as liquid resin composition VII). The chelate compound was completely dissolved. The liquid resin composition VII was kept in a thermostat at 40 ± 2°C. and daily change of the cold curing characteristics was examined. The curing agent employed was 1.0 part of methyl ethyl ketone peroxide per 100 parts of the liquid resin composition. The results obtained were as shown in Table 6.

Table 6

| 40°C.-days<br>Property | Cold curing characteristics of liquid resin composition VII | | | | | |
|---|---|---|---|---|---|---|
| | 0 (The day on which prepared) | 7 | 14 | 21 | 28 | 60 |
| Gel time (min.) | 67.4 | 74.5 | 73.8 | 76.5 | 78.1 | 75.4 |
| Minimum cure time (min.) | 107.9 | 121.1 | 126.4 | 125.0 | 121.8 | 127.4 |
| Peak exothermic temperature (°C.) | 113 | 124 | 94 | 91 | 106 | 95 |

As stated in the foregoing, it is seen that after having been stored for 2 months at 40°C., the unsaturated polyester synthesized in an ordinary manner showed a gel time as large as 5 times the initial value when a conventional cobalt soap accelerator, i.e. cobalt octoate, had been used, whilst in the case where a chelated cobalt accelerator of this invention had been used in an equivalent amount in terms of metal content, the gel time was increased to a value as large as only 1.5 times at the most, indicating marked improvement. The decomposition activity of the chelate compound was found also greater than that of a conventional cobalt soap. Although slightly lower in cure-promoting activity than the chelated cobalt compound, a chelate compound containing copper, manganese, or iron in place of cobalt showed no significant change in activity with time when incorporated into an unsaturated polyester liquid resin composition. Therefore, it is an evident that the objects of this invention may also be achieved with the chelate compounds containing other metals than cobalt.

In the next place, explanation is given below with respect to application of the chelate compound represented by the aforesaid formula to alkyd resins for surface coatings. Because of strong bond between the metal atom and the ligand, the chelate compound astonishingly stable to carboxylic acids and a minute amount of water in the resin as compared with conventional metallic soaps. Consequently, there occurs no such phenomena as liberation of metal ions nor concentration of metal ions in the surface layer of the coated resin composition. This seems to be the reason for the improved drying of the internal part of the coated resin and for the reduced skinning in the superficial layer.

Particularly preferable chelate compounds for use as a drier are those of the aforesaid formula, wherein R, $R_1$ and $R_2$ are $C_1$— to $C_{10}$—alkyl residues, $C_3$— to $C_{13}$- cycloaliphatic alkyl residues, or benzene rings or naphthalene rings. The coating compositions may be incorporated, if necessary, with pigments such as titanium white, red oxide, carbon black, zinc oxide, titanium yellow, and Prussian blue.

The alkyd resins used in Examples were prepared in the following manner. In the following description, all parts and percentages are by weight.

RESIN A

A. A mixture of 65 parts of linseed oil, 14 parts of pentaerythritol, and 0.1 part of lithium naphthenate (metal content, 1.2 percent) was placed in a 2-liter four-necked flask and stirred at 240°C. for about one hour to effect the ester exchange. After the temperature was brought down to 60°C., 21 parts of phthalic anhydride was added to the reaction mixture, and esterification reaction was allowed to proceed at 180°C. for 1 hour. Then the temperature was elevated to 230°C. and the reaction mixture was stirred for 4 hours to complete the esterification. Thereafter, terpene was added to the reaction mixture to obtain an alkyd resin of 70 percent resin content. Characteristics of the resin (designated as resin A) are as shown below.

| Residue on heating | 70.0% |
|---|---|
| Viscosity (Gardner-Holdt, 25°C.) | W |
| Acid value | 5.2 |
| Color number (Gardner-Holdt) | 6 |

RESIN B

B. A mixture of 65 parts of Soybean oil, 13.5 parts of glycerine, and 0.1 part of lithium naphthenate (metal content, 1.2 percent) was subjected to ester exchange in a 2-liter four-necked flask in a manner similar to that described in (A). After addition of 25.6 parts of phthalic anhydride to the reaction mixture, esterification reaction was completed in a manner similar to (A), and the reaction mixture was admixed wih terpene as a solvent to obtain an alkyd resin of 70 percent resin content. Characteristics of the resin (designated as resin B) were as shown below.

| Residue on heating | 70.0 % |
|---|---|
| Viscosity (Gardner-Holdt, 25°C.) | X |
| Acid value | 4.8 |
| Color number (Gardner-Holdt) | 4 |

RESIN C

C. The soybean oil in (B) was replaced by safflower oil (the amount of glycerine and that of phthalic anhydride were the same as in (B)). Esterification was completed in the same manner as in (B). After addition of terpene, an alkyd resin, 70 percent in resin content, was obtained. The characteristics of the resin (designated as resin C) were as shown below.

| | |
|---|---|
| Residue on heating | 70.0 % |
| Viscosity (Gardner-Holdt, at 25°C.) | Y |
| Acid value | 6.2 |
| Color number (Gardner-Holdt) | 3 |

RESIN D

A mixture of 40 parts of safflower oil, 10 parts of glycerine, and 0.01 part of lithium hydroxide was placed in a 2-liter four-necked flask and stirred at 230°C. for about 1 hour to effect the ester exchange. After the temperature had been brought down to 50°C., 13 parts of glycerine and 42.8 parts of phthalic anhydride were added to the reaction mixture, and esterification reaction was allowed to proceed at 180°C. for 2 hours. Then, the temperature was elevated to 210°C. and the reaction mixture was stirred for 5 hours to complete the esterification. Thereafter, xylene was added to the reaction mixture as a solvent to obtain an alkyd resin, 60 percent in resin content. Characteristics of the resin (designated as resin D) were as shown below.

| | |
|---|---|
| Residue on heating | 60.0 % |
| Viscosity (Gardner-Holdt, 25°C.) | Z |
| Acid value | 5 |
| Color number (Gardner-Holdt) | 2 |

The methods for testing coated film in Examples were as mentioned below.

1. HARDNESS BY PENCIL TEST

Test specimen in plate form, which had been kept for 10 days after coating and drying, was fixed in a horizontal position. Various pencils, from 6B to 6H, which had been arranged at an angle of 45° to the horizontal plane, were allowed to travel in the direction of the pencil while lightly contacting with the film surface of the test specimen. The hardness of the pencil lead which was unable to leave a scratch was taken as the hardness of the coated film by pencil test.

2. CHEMICAL RESISTANCE

Ten days after coating and drying, a test specimen was immersed in 1.0 percent-aqueous sodium hydroxide solution and 5.0 percent-hydrochloric acid, and withdrawn at regular intervals to inspect chemical resistance of the coated film.
◎ All right
O Yellowing and blistering 10D - 9D
Δ Yellowing and blistering, 8D - 6D
× Blistering 5D - 2D, or entire scaling

3. WATER RESISTANCE (40°C, WARM WATER)

Testing method and evaluation basis were similar to those for chemical resistance.

4. SKINNING

One hundred grams of an alkyd resin admixed with a drier was kept in a thermostat at 25°C. and the weight of the portion which did not gelled was measured and compared.
◎ Gelation degree 0 – 5 percent
O Gelation degree 6 – 10 percent
Δ Gelation degree 11 – 20 percent
× Gelation degree 21 percent <

EXAMPLE 7

Two types of resins E and F were compared with each other for performance characteristics of the coated film and for skinning. The resin E was prepared by addition of 0.30 percent of lead naphthenate and 0.03 percent of cobalt naphthenate (both figures are in terms of metal content based on resin component) to 50 parts of linseed oil-modified alkyd resin (resin A). Resin F was prepared by addition of 0.30 percent of lead naphthenate and 0.03 percent of a chelate compound of the formula to the resin A. By means of a bar coater these resins were coated on an untreated steel sheet so that the dried film of 35 μ in thickness may be obtained. Before testing the test specimen was kept at 20°C. and 65 percent relative humidity for 10 days. The results obtained were as shown in Table 7.

Table 7

| | Resin E | Resin F |
|---|---|---|
| Adhesion | ◎ | ◎ |
| Water resistance (25°C., 7 days) | ◎ | ◎ |
| Chemical resistance (5 % HCl, 24 hrs.) | ◎ | ◎ |
| Hardness by pencil test (after 7 days) | 6B OK | 6B OK |
| Skinning (after 7 days) | × | ◎ |

EXAMPLE 8

To each of the resins A (50 parts), B (50 parts), C (50 parts), and D (58 parts), was added 0.03 percent (in terms of metal content based on the resin component) of cobalt naphthenate to obtain the resins G, H, I, and J. On the other hand, to each of the resins A (50 parts), B (50 parts), C (50 parts), and D (58 parts), was added 0.03 percent (in terms of metal content based on the resin component) of a chelate compound used in Example 7 to obtain the resins G', H', I', and J'. These resins were compared with one another for performance characteristics of the coated film and for skinning. The method of coating was the same as in Example 7. Before testing the test specimens were kept at 20°C. and 65 percent relative humidity for 10 days. The results obtained were as shown in Table 8.

Table 8

| | Resin G | Resin G' | Resin H | Resin H' | Resin I | Resin I' | Resin J | Resin J' |
|---|---|---|---|---|---|---|---|---|
| Adhesion | ◎ | ◎ | ◎ | ◎ | ◎ | ◎ | ◎ | ◎ |
| Water resistance (25°C., 7 days) | ◎ | ◎ | ◎ | ◎ | ◎ | ◎ | ◎ | ◎ |
| Chemical resistance (5 % HCl/24 hrs.) | ◎ | ◎ | ◎ | ◎ | ◎ | ◎ | ◎ | ◎ |
| Hardness by pencil test (after 7 days) | 6B X | 6B OK | 6B OK | 5B OK | 6B OK | 5B OK | 4B | 2B |
| Skinning (after 7 days) | × | ◎ | × | ◎ | × | ◎ | Δ | ◎ |

EXAMPLE 9

To each 50 parts of the resin A, was added 0.03 percent (in terms of metal content based on the resin) of a chelate compound of the formula wherein M is cobalt, manganese, copper, or lead. These resins were compared with one another for performance characteristics of the coated film and for skinning. The method of coating was the same as in Example 7. Before testing the test specimens were kept at 20°C. and 65 percent relative humidity for 10 days. The results obtained were as shown in Table 9.

Table 9

| Metal in chelate compound | Cobalt | Manganese | Copper | Lead |
|---|---|---|---|---|
| Adhesion | ◎ | ◎ | ◎ | ◎ |
| Water resistance (25°C., 7 days) | ◎ | ◎ | ◎ | ◎ |
| Chemical resistance (5 % HCl/24 hrs.) | ◎ | ◎ | ◎ | ◎ |
| Hardness by pencil test (after 14 days) | 4B OK | 5B OK | 6B OK | 6B OK |
| Skinning (after 7 days) | ◎ | ◎ | ◎ | ◎ |

EXAMPLE 10

To the resin A, was added 0.03 percent (in terms of metal content based on the resin) of a chelate compound of the formula, or The resulting resins K and L were compared with each other for performance characteristics of the coated film and for skinning. The method of coating was the same as in Example 7. Before testing the test specimens were kept at 20°C. and 65 percent relative humidity for 10 days. The results obtained were as shown in Table 10.

Table 10

| | Resin K | Resin L |
|---|---|---|
| Adhesion | ◎ | ◎ |
| Water resistance (25°C., 7 days) | ◎ | ◎ |
| Chemical resistance (5 % HCl, 24 hrs.) | ◎ | ◎ |
| Hardness by pencil test (after 7 days) | 6B OK | 6B OK |
| Skinning (after 7 days) | ◎ | ◎ |

The metallic soaps conventionally used as a drier had such disadvantages as gel formation (skinning) in the surface layer of a resin and poor stability in the resin, particularly to a minute amount of water present in the resin. On the contrary, as is apparent from the aforesaid Examples 7 to 10, it is seen that such disadvantages observed in conventional metallic soaps are markedly improved by adding to an unsaturated alkyd resin 0.01 to 0.50 percent, more preferably 0.02 to 0.20 percent by weight (in terms of metal content) of a chelate compound represented by the formula (I) or (II). As a result of comparison of drying characteristics between, for example, the alkyd resin E, wherein lead naphthenate (0.30 percent by weight in terms of metal content) and cobalt naphthenate (0.03 percent in terms of metal content) had been incorporated and the alkyd resin F, wherein 0.03 percent by weight of a chelate compound in Example 7, it was found that although there is no great difference between the resins E and F with respect to drying characteristics (adhesion, water resistance, chemical resistance, and hardness by pencil test), the resin E showed gelation in the surface layer at room temperature in 4 days after addition of a drier, whereas the resin F showed no gelation in the surface layer after standing for 10 days at room temperature.

From the results obtained in Example 8, it is apparent that effectiveness of the chelate compound represented by the formula (I) or (II) according to this invention is independent of the type and length of oils in alkyd resins (resins G', H', I', and J'). Thus, it is seen that various disadvantages observed in conventional metallic soaps may be markedly improved by using a chelate compound of the formula (I) or (II) as a drier.

What is claimed is:

1. An alkyd resin composition comprising an alkyd resin and a chelate compound having a catalytic activity and represented by the formula wherein M is a metal of the first transition metal group except for nickel, lead, or zirconium; $Ar_1$ and $Ar_2$ are independently an aromatic residue, a substituted aromatic residue, or a heterocyclic aromatic residue; $R, R_1$ and $R_2$ are independently hydrogen, an alkyl residue, a cycloaliphatic alkyl residue, a substituted aromatic residue, or a jointed residue of these radicals, and the carbon chains of $R$, $R_1$ and $R_2$ may contain hetero atoms selected from the group consisting of O, N and S, said chelate compound being present in said composition in an amount that promotes curability of said alkyd resin.

2. A resin composition according to claim 1, wherein the alkyd resin is an unsaturated polyester resin and the amount of the chelate compound present is within the range of 0.0005 to 0.1 part by weight in terms of metal per 100 parts of the unsaturated polyester resin.

3. A resin composition according to claim 1, wherein the alkyd resin is an oil-modified alkyd resin and said composition contains from 0.01 to 0.50 percent by weight of the chelate compound in terms of metal based on the modified alkyd resin.

4. A resin composition according to claim 1, wherein said composition further contains an organic peroxide as a curing agent.

5. A resin composition according to claim 1, wherein in the formula representing the chelate compound M is cobalt, copper, or manganese, and $Ar_1$ and $Ar_2$ are benzene nuclei; and the alkyd resin is an unsaturated polyester resin prepared by dissolving an alkyd resin and one or more polymerizable monomers in each other.

6. A resin composition according to claim 1, wherein the alkyd resin is an unsaturated polyester resin prepared by dissolving an alkyd resin and one or more polymerizable monomers in each other.

7. A resin composition according to claim 6, wherein the chelate compound is N,N'-bis(salicylidene)butylenediiminato cobalt.

8. A resin composition according to claim 6, wherein the chelate compound is bis(N-phenylsalicylideneiminato)cobalt.

9. A resin composition according to claim 6, wherein the chelate compound is bis(N-cyclohexylsalicylideneiminato)cobalt.

10. A resin composition according to claim 6, wherein the chelate compound is N,N'-bis(-salicylidene)-1,8-naphthalenediiminato cobalt.

11. A resin composition according to claim 6, wherein the chelate compound is bis(N-tert-butylsalicylideneiminato)copper.

12. A resin composition according to claim 6, wherein the chelate compound is bis(N-tert-butylsalicylideneiminato) manganese.

13. A resin composition according to claim 1, wherein in the formula representing the chelate compound M is cobalt, copper, or manganese, and $Ar_1$ and $Ar_2$ are benzene nuclei; and the alkyd resin is an oil-modified alkyd resin.

14. A resin composition according to claim 1, wherein the alkyd resin is an oil-modified alkyd resin.

15. A resin composition according to claim 14, wherein the chelate compound is bis(N-cyclohexylsalicyclideneiminato)cobalt.

16. A resin composition according to claim 14, wherein the chelate compound is bis(N-phenylsalicylideneiminato)cobalt.

17. A resin composition according to claim 14, wherein the chelate compound is bis(N-tert-butylsalicylideneiminato)copper.

18. A molding composition containing the resin composition according to claim 1.

19. A surface coating composition containing the resin composition according to claim 14.

20. A method which utilizes a chelate compound represented by the formula wherein M is a metal of the first transition metal group, except for nickel, lead, or zirconium; $Ar_1$ and $Ar_2$ are independently aromatic residues, substituted aromatic residues, or heterocyclic aromatic residues; R, $R_1$ and $R_2$ are independently hydrogen, alkyl residues, cycloaliphatic alkyl residues, aromatic residues, substituted aromatic residues, or jointed residues of these radicals; and carbon chains of R, $R_1$ and $R_2$ may contain hetero atoms as a curing promoter for an unsaturated polyester resin containing one or more polymerizable monomers in the mutually dissolved state, said chelate compound being present in an amount that promotes curability of said unsaturated polyester resin.

21. A method according to claim 20, wherein the chelate compound is present in an amount that ranges from 0.0005 to 0.1 part in terms of metal per 100 parts by weight of the unsaturated polyester resin.

22. A method which utilizes a chelate compound represented by the formula wherein M is a metal of the first transition metal group except for nickel; or lead or zirconium; $R_1$ and $R_2$ are independently hydrogen, alkyl residues, cycloaliphatic alkyl residues, aromatic residues, or jointed residues of these radicals; and $Ar_1$ and $Ar_2$ are independently aromatic residues, substituted aromatic residues, or heterocyclic aromatic residues as a drier for an alkyd resin surface coating, said chelate compound being present in an amount that promotes curability of said alkyd resin forming said surface coating.

23. A method according to claim 22, wherein the amount of chelate compound added to said modified alkyd resin is from 0.01 to 0.50 percent by weight in terms of metal content based on the modified alkyd resin.

* * * * *